(12) United States Patent
Leconte et al.

(10) Patent No.: US 10,758,957 B2
(45) Date of Patent: Sep. 1, 2020

(54) METHOD FOR MANUFACTURING A TIAL BLADE OF A TURBINE ENGINE

(71) Applicants: SAFRAN AIRCRAFT ENGINES, Paris (FR); SAFRAN, Paris (FR)

(72) Inventors: Gilbert Leconte, Moissy-Cramayel (FR); Jean-Michel Franchet, Moissy-Cramayel (FR); Pierre Sallot, Moissy-Cramayel (FR)

(73) Assignees: SAFRAN AIRCRAFT ENGINES, Paris (FR); SAFRAN, Paris (FR)

( * ) Notice: Subject to any disclaimer, the term of this patent is extended or adjusted under 35 U.S.C. 154(b) by 4 days.

(21) Appl. No.: 15/576,783

(22) PCT Filed: May 26, 2016

(86) PCT No.: PCT/FR2016/051244
§ 371 (c)(1),
(2) Date: Nov. 24, 2017

(87) PCT Pub. No.: WO2016/189254
PCT Pub. Date: Dec. 1, 2016

(65) Prior Publication Data
US 2018/0304329 A1 Oct. 25, 2018

(30) Foreign Application Priority Data
May 26, 2015 (FR) .................................... 15 54696

(51) Int. Cl.
*B23P 15/02* (2006.01)
*B21C 23/00* (2006.01)
(Continued)

(52) U.S. Cl.
CPC .......... *B21C 23/002* (2013.01); *B21C 23/142* (2013.01); *B21C 23/16* (2013.01);
(Continued)

(58) Field of Classification Search
CPC ... B21C 23/002; B21C 23/142; B21C 35/023; B21C 23/16; B21C 23/01; B23P 15/02;
(Continued)

(56) References Cited

U.S. PATENT DOCUMENTS 5,411,700 A 5/1995 Martin
7,052,637 B1 * 5/2006 Strand ..................... B21C 23/14
264/148

(Continued)

FOREIGN PATENT DOCUMENTS

CN 101618499 A 1/2010
EP 1 785 502 A1 5/2007
(Continued)

OTHER PUBLICATIONS

French Preliminary Search Report dated Mar. 30, 2016 in Patent Application No. FR 1554696 (with English translation of categories of cited documents), citing documents AA-AE and AO-AT therein, 3 pages.

(Continued)

*Primary Examiner* — Jun S Yoo
(74) *Attorney, Agent, or Firm* — Oblon, McClelland, Maier & Neustadt, L.L.P.

(57) ABSTRACT

A method for manufacturing a titanium aluminide blade of a turbine engine, including production of a titanium aluminide ingot, extrusion of the ingot through an opening in a die having one main arm and at least one side arm, such as to obtain a extruded ingot having the shape of a bar with a cross-section having one main arm and at least one side arm substantially perpendicular to the main arm, transverse cutting of the extruded ingot such as to obtain sections of extruded ingot, forging of each section of extruded ingot such as to obtain a turbine engine blade.

5 Claims, 6 Drawing Sheets

(51) Int. Cl.
*B22F 3/17* (2006.01)
*B22F 3/20* (2006.01)
*B21C 23/16* (2006.01)
*B22F 5/04* (2006.01)
*B21C 35/02* (2006.01)
*B23P 13/02* (2006.01)
*B21C 23/14* (2006.01)
*B21K 3/04* (2006.01)
*F01D 5/14* (2006.01)

(52) U.S. Cl.
CPC .............. *B21C 35/023* (2013.01); *B21K 3/04* (2013.01); *B22F 3/17* (2013.01); *B22F 3/20* (2013.01); *B22F 5/04* (2013.01); *B23P 13/02* (2013.01); *B23P 15/02* (2013.01); *F01D 5/14* (2013.01); *B22F 2998/10* (2013.01); *F05D 2230/10* (2013.01); *F05D 2230/24* (2013.01); *F05D 2230/25* (2013.01); *F05D 2240/24* (2013.01); *F05D 2300/174* (2013.01)

(58) Field of Classification Search
CPC ... B23P 13/02; B21K 3/04; F01D 5/14; F01D 2240/24; F01D 2230/10; B22F 5/04; B22F 3/20; B22F 3/17; B22F 2998/10; B22F 9/082; F05D 2230/24; F05D 2300/174; F05D 2230/25; B23K 3/04
See application file for complete search history.

(56) References Cited

U.S. PATENT DOCUMENTS

| | | | |
|---|---|---|---|
| 2005/0005445 A1* | 1/2005 | Ferte | B23K 20/023 29/889.2 |
| 2006/0026832 A1* | 2/2006 | Bergue | B21D 53/78 29/889.72 |
| 2007/0107202 A1 | 5/2007 | Das | |
| 2011/0142708 A1* | 6/2011 | Didomizio | B22F 3/15 419/19 |
| 2012/0048430 A1* | 3/2012 | Das | B21J 1/00 148/557 |
| 2013/0129556 A1 | 5/2013 | Didomizio et al. | |
| 2015/0292339 A1* | 10/2015 | De Ponnat | B23P 15/02 416/241 R |
| 2016/0153286 A1* | 6/2016 | Suciu | F01D 5/28 60/805 |

FOREIGN PATENT DOCUMENTS

| | | |
|---|---|---|
| EP | 2 335 849 A1 | 6/2011 |
| EP | 2 423 340 A1 | 2/2012 |
| JP | H 9-3503 A | 1/1997 |
| JP | H 11-10270 A | 1/1999 |
| JP | 2001-316743 A | 11/2001 |
| JP | 2004-353669 A | 12/2004 |
| JP | 2005-238334 A | 9/2005 |
| JP | 2007-56340 A | 3/2007 |
| RU | 2 254 200 C1 | 6/2005 |

OTHER PUBLICATIONS

International Search Report dated Aug. 25, 2016 in PCT/FR2016/051244 (with English translation of categories of cited documents), citing documents AA-AE, AO, AP and AR-AT therein, 4 pages.

Grigoryan Eh. B. et al., "Blank of Blade Making Method, Comprises Steps of Forming Blank of Blade by Extruding it in the Form of H-Beam with Bridge Thickness no Less than Predetermined Maximum Thickness of Widened Part of Blade Blank" WPI / Thomson, vol. 2005, No. 43, XP002665803, Jun. 20, 2005.

Grigoryan Eh. B. et al., "Blank of Blade Making Method, Comprises Steps of Forming Blank of Blade by Extruding it in the Form of H-Beam with Bridge Thickness no Less than Predetermined Maximum Thickness of Widened Part of Blade Blank" WPI / Thomson, vol. 2005, No. 43, XP002665803, Jun. 20, 2005, 1 Page.

* cited by examiner

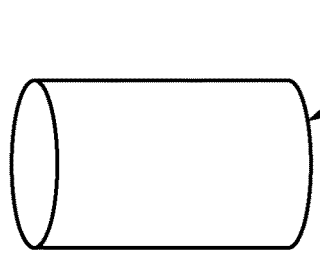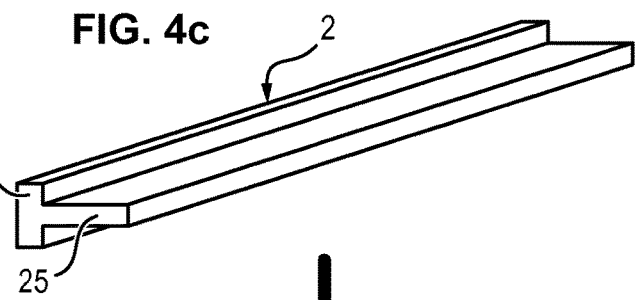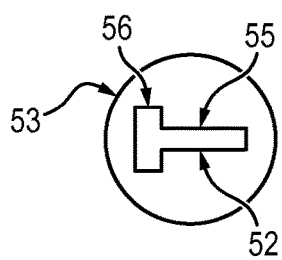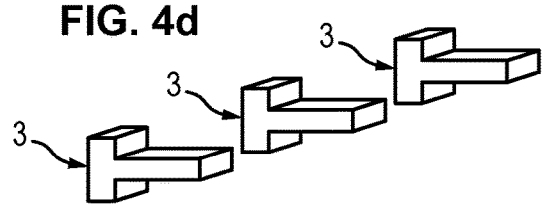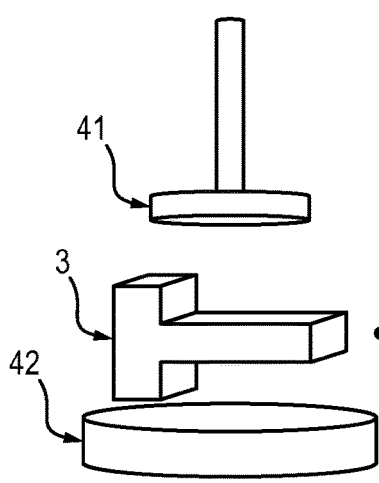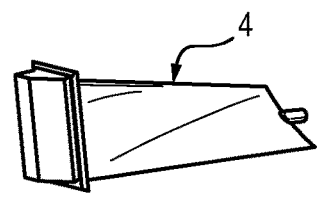

METHOD FOR MANUFACTURING A TIAL BLADE OF A TURBINE ENGINE

FIELD OF THE INVENTION

The present invention relates to the field of methods for manufacturing blades of turbine engines. The present invention applies advantageously to the manufacture of turbine engine rotor blades, but can also apply to the manufacture of straightener blades.

PRIOR ART

Conventionally, as illustrated in FIG. 1a, a moving blade 4 of a turbine engine comprises a vane 30 extending along the main axis of the blade, between the proximal and distal (i.e. inner and outer) ends of the blade. At its proximal end, the blade 30 comprises a root 10 by which it is attached to the turbine engine, and in particular to a disk of the rotor of the turbine engine in the case of a turbine engine rotor blade. At its distal end, or free end, the blade 30 can comprise a transverse element, called a heel 20. When several moving blades 30 are attached to a rotor disk, their heels 20 are disposed edge-to-edge so as to form a circumferential ring which in particular has the function of delimiting on the outside the flow stream of the gas passing through the turbine engine and thus limiting gas leaks at this location.

In operation, the rotation of the turbine engine moving blade 4 generates a centrifugal force oriented in the direction of the main axis of the moving blade 4, called hereafter the loading axis Ac. In particular, the root 10, which provides the mechanical connection between the vane 30 and the rotor disk, is the site of considerable mechanical stress oriented along the loading axis Ac of the blade.

The turbine engine moving blades 4 are conventionally manufactured from nickel-based alloys by traditional casting.

Moreover, intermetallic alloys are known based on titanium aluminides, called hereafter titanium aluminides or TiAl, which are alloys consisting of titanium aluminide in which a minor fraction of the aluminum and titanium atoms can be replaced by other atoms, such as zirconium, iron, molybdenum, silicon or niobium.

TiAl alloys have specific mechanical properties comparable, until 750° C., to those of a nickel-based alloy in traditional casting. TiAl alloys have, at least partially, a lamellar grain structure which increases their mechanical strength. In addition, TiAl has low specific density, on the order of 4, significantly smaller than that of nickel-based alloys, which is on the order of 8. This is why the manufacture of TiAl turbine engine blades has been contemplated as a replacement for nickel-based alloys, for the purpose of reducing the mass of the turbine engine blades.

TiAl alloys, however, have several disadvantages which complicate their use for the manufacture of turbine engine moving blades. In particular, they are fragile at low temperatures, which translates into low extension to failure and reduced resistance to cracking.

Moreover, the forming of the TiAl alloy for manufacturing a turbine engine moving blade is very delicate, because the industrial forgeability window, namely the compromise between temperature and forming rate, is very narrow. Castability is also problematic because the rapid solidification rate of these alloys exposes the final part to risks of considerable piping and porosity.

As illustrated in FIG. 1b, it has been proposed to manufacture moving blades in TiAl by casting, an ingot being formed by liquid metal casting (VIM) in a step E11, then formed by casting in a step E12, followed by a step E13 of hot isostatic pressing (HIP) to confer good properties on them before being machined from solid during a step E14. The forming of the TiAl alloy by casting is extremely difficult due to poor castability of the TiAl alloy which does not allow sufficiently thin sections to be cast to manufacture parts with finished-ribs, i.e. having the shape of the final part. It is therefore necessary to machine the entire periphery of the raw casting to obtain the final part.

As illustrated in FIG. 1b, it has also been proposed to manufacture moving blades in TiAl by forging, an ingot being formed by liquid metal casting (VIM) in a step E11 of by powder spraying in a step E12 in a cladding 7, followed by a HIP step E13 and a stripping step E15, then forming by conventional forging in a step E17. The forming of the TiAl alloy by conventional hot-die forging E17 is also very difficult. In fact, it has not been possible to determine any industrial forgeability window for TiAl alloy, all tests having resulted in the cracking of the forged part. In addition, the conventional forging method E17 does not allow the final part to be forged directly. In fact, as considerable excess thicknesses remain after the forging step, it is necessary to carry out a final machining step E18 to obtain the final part.

Although isothermal forging E16 allows finished-ribs to be approached significantly more closely, a considerable machining step 18 remains necessary. Moreover, isothermal forging E16 is unproductive and costly, due mainly to the short lifespan of the dies.

In addition, in all the methods of the prior art to implement TiAl alloys, it is necessary to use a hot isostatic pressing (HIP) step E13 to confer good properties to them. This step is costly, does not allow a particular shape to be given to the material, and involves elevated temperatures which have a tendency to cause grain sizes to increase.

There therefore exists an important need for a method for manufacturing turbine engine moving blades by forming TiAl alloy, which does not have these disadvantages.

DISCLOSURE OF THE INVENTION

The invention proposes a method for manufacturing a turbine engine blade by forming a TiAl alloy.

To this end, the invention proposes a method for manufacturing a turbine engine blade, made of titanium aluminide, including steps of:
- formation of a titanium aluminide ingot;
- extrusion of the ingot through an opening of a die having a main slot and at least one side slot, so as to obtain an extruded ingot having the shape of a bar of which a cross-section has a main branch and at least one side branch substantially perpendicular to the main branch;
- transverse cutting of the extruded ingot so as to obtain sections of extruded ingot;
- forging of each section of extruded ingot so as to obtain a turbine engine blade.

"Substantially perpendicular" means that a side branch slightly inclined with respect to the main branch can be considered, this inclination possibly being a few degrees to ten degrees or thirty degrees.

Extrusion allows the structure of TiAl alloys to be refined so as to reduce the flow stress of the alloy, namely the stress needed to cause plastic deformation of the alloy. It is then possible to employ, after extrusion, conventional forging means to get parts near the ribs, i.e. near the final shapes and final dimensions of the blade, which was impossible in the methods of the prior art. The invention thus allows limiting the subsequent machining steps, which consequently allows time to be saved and a reduction in the quantity of wasted material.

The proposed method allows the elimination of the hot isostatic pressing step.

Extrusion allows simultaneously giving the extruded ingot a cross section shape having a main branch and at least one side branch substantially perpendicular to the main branch, which allows the root of the blade to be formed by forging in the first side branch, and the heel, if it exists, in the second side branch. Thus, the shape of the extruded ingot approximates that of the final part, which allows a reduction in the necessary deformation during the final step of conventional forging.

Finally, the forging of the side branch of the extruded ingot causes an orientation of the lamellae of the alloy, due to the influence of deformation work, in the direction perpendicular to the loading axis of the blade. The orientation of the lamellae of the alloy in the direction perpendicular to the loading axis of the blade, allows an increase in the resistance of the blade to the mechanical stresses to which it will be subjected during operation.

The combined use of an ingot made from powders and from the container extrusion, stripping and forging step, allows bars to be obtained having a chemically homogeneous microstructure and having a small grain size. In the case where the ingot is made by powder spraying, the extrusion step allows grouping into a single step the compaction of the powder, its sintering, and its formation and to retain a fine microstructure.

U.S. Pat. No. 5,411,700 specifies, column 3 line 18 to 27, that densification is only 95% and the container is eliminated prior to extrusion, which is not the case in the present invention. In fact, the extrusion of powders in a container allows both compaction with densification to 100%, refining the structure, and forming prior to final forging in the case of a shaped extrusion.

In addition, a densification of 95% as in document U.S. Pat. No. 5,411,700 would lead to considerable cracking regardless of the forging conditions.

The invention s advantageously completed by the following features, taken individually or in any one of their technically possible combinations.

The opening of the die has a single side slot, so as to obtain an extruded ingot in the form of a bar with a cross-section having a main branch and a single side branch, the vane of the blade being forged in the main branch while the root of the blade will be forged in the side branch.

Alternatively, the opening of the die has a first side slot which extends from one end of the main slot perpendicular to it, and a second side slot which extends from the other end of the main slot substantially perpendicular to it, so as to obtain an extruded ingot in the form of a bar having a cross-section having a main branch, a first side branch extending substantially perpendicular to the main branch from one end thereof, and a second side branch extending substantially perpendicular to the main branch from the other end thereof. The vane is then forged in the main branch, the root of the blade being forged in the first side branch and the heel in the second side branch.

Forging is carried out in the open air, which is less constraining than isothermal forging.

Forging is carried out with a tooling temperature comprises between 600° and 950°, which is less constraining that isothermal forging.

For the TiAl 48-2-2 (Ti-48Al-2Cr-2Nb (atomic %)) alloy, when the ingot is obtained by powder spraying, the manufacturing method further includes a cladding step of the ingot prior to extrusion and a stripping step between the extrusion step and the forging step.

The ingot being formed by liquid metal casting. In the case where the ingot is formed by casting, the structure obtained is a relatively heterogeneous solidification structure and with a very large cast grain size. In this case, extrusion will homogenize and refine the coarse initial structure until small grain sizes on the order of 50 µm is obtained.

The ingot being formed by powder spraying. The combined use of a fine powder as well as extrusion allows bars having a chemically homogeneous microstructure and having a small grain size to be obtained. In the case where the ingot is made by powder spraying, the extrusion step allows grouping into a single step the compaction of the powder, its sintering, its forming and especially to preserve a fine microstructure, which can be grown if necessary.

The method can further comprise a machining step after the forging step which allows the part to be finalized.

The invention also proposes a turbine engine blade obtained by a method as described.

The turbine engine blade obtained by a method as described is characterized by the grain of the alloy which constitutes it.

In fact, the grain of the alloy constituting a turbine engine blade obtained by a method as described is of a size on the order of 50 µm, substantially smaller than the grain of the alloy of a turbine engine blade obtained by another method.

In addition, a turbine engine blade obtained by a method as described is distinguished from a turbine engine blade obtained by another method by the fact the lamellar grains of the alloy are oriented in the direction perpendicular to the loading axis of the blade.

The invention also proposes a turbine engine rotor comprising at least one turbine engine blade obtained by a method as described above.

The invention also proposes a turbine engine comprising at least one turbine engine blade obtained by a method as described above.

DESCRIPTION OF THE FIGURES

Other objectives, features and advantages will be revealed by the detailed description which follows, with reference to the drawings given by way of non-limiting illustration among which:

FIGS. 4a to 4f illustrate the first embodiment of the method according to the invention in particular, FIG. 4a shows an ingot prior to extrusion;

FIG. 4b shows a front view of an ingot;

FIG. 4c shows an ingot after extrusion;

FIG. 4d shows an ingot cut into sections;

FIG. 4e illustrates schematically the forging step;
FIG. 4f shows the ingot section after the forging step.
FIG. 5a shows an ingot before extrusion;
FIG. 5b shows a front view of the die;
FIG. 5c shows an ingot after extrusion;
FIG. 5d shows an ingot cut into sections;
FIG. 5e illustrates schematically the forging step.

DETAILED DESCRIPTION OF THE INVENTION

Figure 3:
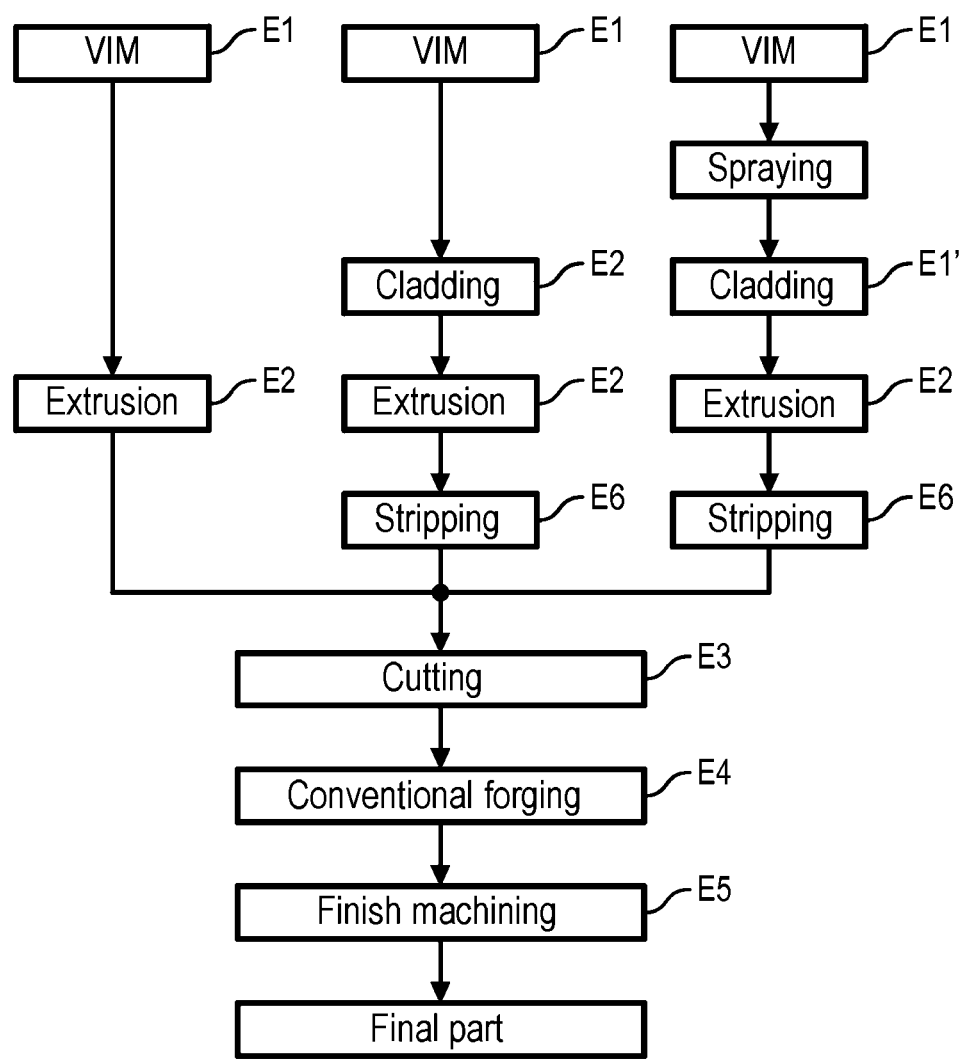
FIG. 3 illustrates the different steps of the method according to the invention, based on several possibilities.

As illustrated in FIG. 3, the method for manufacturing a turbine engine blade includes steps of:
E1 formation of a titanium aluminide ingot 1;
E2 extrusion of the ingot 1;
E3 transverse cutting of the extruded ingot 2 so as to obtain sections of extruded ingot;
E4 forging of the sections 3 of extruded ingot so as to obtain a turbine engine blade 4.

Formation of an Ingot 1

Step E1 consists of forming an ingot 1 in titanium aluminide.

The method can be applied to any type of titanium aluminides.

In particular, the method can be applied to the Ti-48Al-2Cr-2Nb (atomic %)) alloy, hereafter denoted TiAl 48-2-2. It constitutes an acceptable compromise in terms of mechanical properties.

In particular, the method can be applied to so-called beta alloys of the type represented by the formula Ti—Al(a)Nb(b)Mo(c)B(d) in which "a", "b", "c" and "d" are expressed in atomic percentage, "a" varying between approximately 44 and approximately 48, "b" varying between approximately 2 and approximately 6, "c" varying between approximately 0 and approximately 2 and "d" varying between approximately 0.01 and approximately 1.0. These alloys have excellent strength and hardness.

The method can also be applied to alloys of the type represented by the formula Ti—Al—Cr—Nb—Si—Fe—Mo—Zr, such as for example an alloy containing atomically 44 to 49% aluminum, 0.5 to 3% zirconium, 0.5 to 3% iron, 0.5 to 2% molybdenum, 0.2 to 0.5% silicon, 0 to 3% niobium, the complement to reach 100% being titanium and inevitable impurities.

The ingot is typically prepared by liquid metal casting (method currently called VIM for "vacuum induction melting"). During liquid metal casting, different constituents intended to form the alloy are melted by heating, then the molten metal bath is cast into a container under vacuum. The ingot 1 is typically of cylindrical shape with a circular cross-section. For this purpose, the container has a hollow cylindrical shape.

In the case where the ingot is made by casting in a container under vacuum, the structure obtained is a relatively heterogeneous solidification structure with a very large cast grain size (on the order of 300-500 µm). In this case, extrusion will homogenize and refine the initial coarse grain structure until small grain size on the order of 50 µm is obtained.

Beta type alloys have a tendency to segregate chemically during their preparation.

Extrusion allows the grain size to be acted upon but has no impact on the chemical homogeneity of the alloy. That is why, for the latter, it can be attractive to start with powders in order to form an intermediate product, prior to forging, that is more homogeneous chemically. To this end, the liquid metal casting is followed by powder spraying. This method consists of spraying a stream of material obtained from a bath of melted metal. The droplets of material solidify in an atomization chamber thanks to convective exchange with the surrounding gas, typically argon, and yield a powder. This is collected at the atomization gas outlet and placed in a cladding 7, which can be machined in a different material from that of the powders, such as stainless steel for example. The cladding 7 typically has a hollow cylindrical shape. The use of powder metallurgy makes it possible to correct the homogenization difficulties of segregating alloys. All the operations for handling the powder, filling the cladding as well as its sealing, must be carried out under a neutral atmosphere or under vacuum so as to limit the contamination of the latter by oxygen. The combined use of a fine powder and extrusion allows bars to be obtained having a chemically homogeneous microstructure and having small grain size. In the case where the ingot is prepared by powder spraying, the extrusion step allows grouping into a single step the compaction of the powder, its sintering, its forming and especially retaining a fine microstructure, which can be grown if necessary.

Extrusion of the Ingot 1

During step E2, the ingot is subjected to forming by extrusion. Extrusion allows the ingot to be formed by compression. The ingot formed by extraction is called the extruded ingot 2.

Figure 6A:
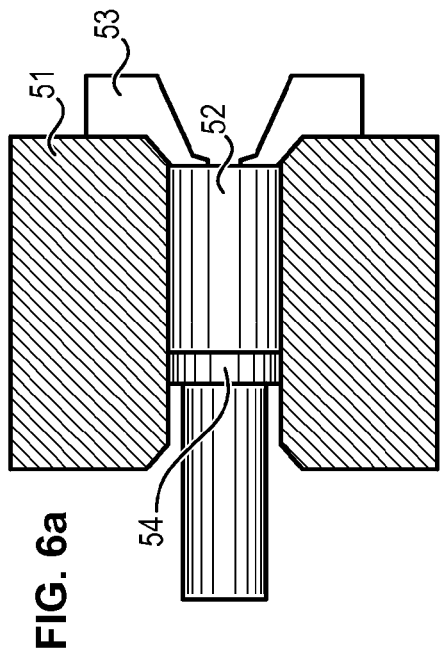
FIGS. 6a to 6d illustrate the extrusion step, FIGS. 6a and 6b illustrating extrusion without cladding and FIGS. 6c and 6d illustrating extrusion with cladding.
Figure 6B:
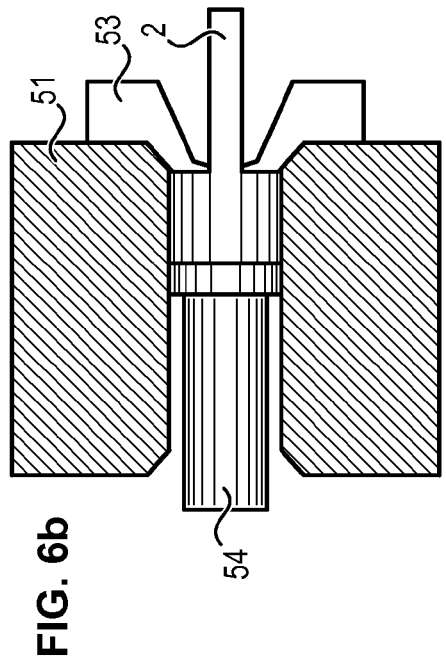
Figure 6C:
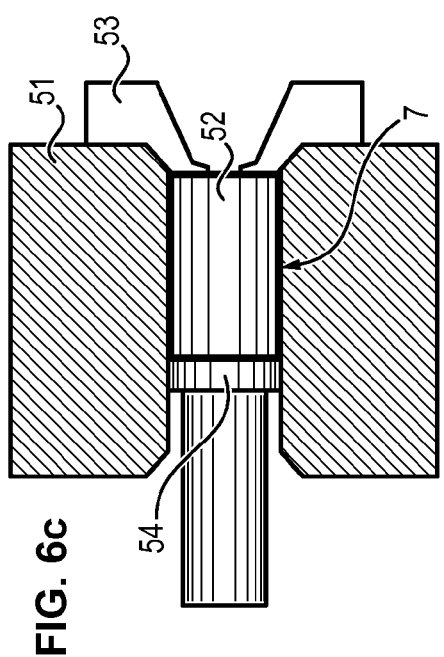
Figure 6D:
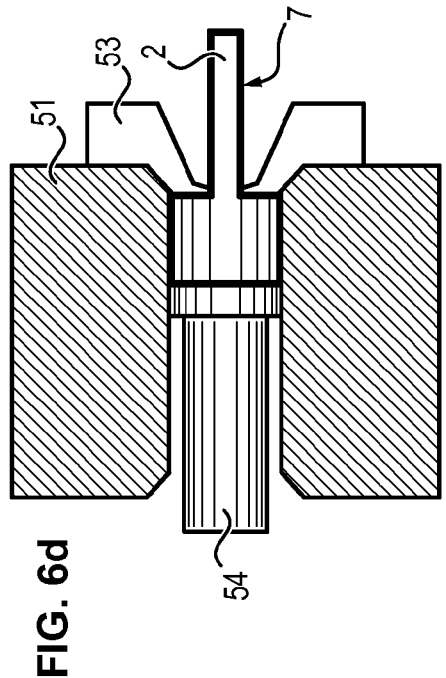

Step E2 consists of having the ingot (possibly made ductile by heating to the so-called extrusion temperature) pass through an opening 52 of a die 53, as illustrated in FIGS. 6a and 6b. As illustrated in FIG. 6a, the ingot 1, generally placed in a container 51, is pushed into the die 53 by means of a press 54, typically a hydraulic press, a pump or an extruder screw, so as to make it remerge from the opening 52 by exerting thrust. Beginning with a certain force exerted by the press 54, there is plastic flow of the ingot through the opening 52 of the die 53, as illustrated in FIG. 6b. The extruded ingot 2 therefore has a shape with a transverse section corresponding to the shape of the opening 52.

Extrusion makes it possible to homogenize and very strongly refine the structure of the alloy, consequently to reduce the flow stress, namely the stress necessary to cause plastic deformation of the alloy.

Figure 1B:
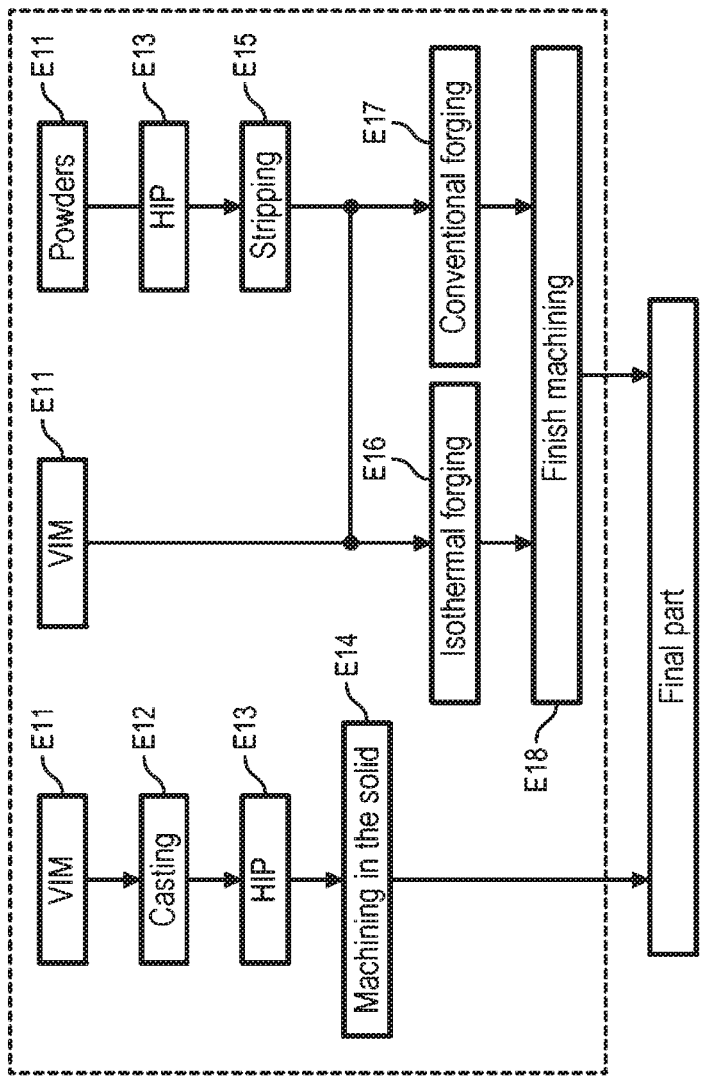
FIG. 1b, discussed above, shows the different TiAl forming methods of the prior art.
Figure 1A:
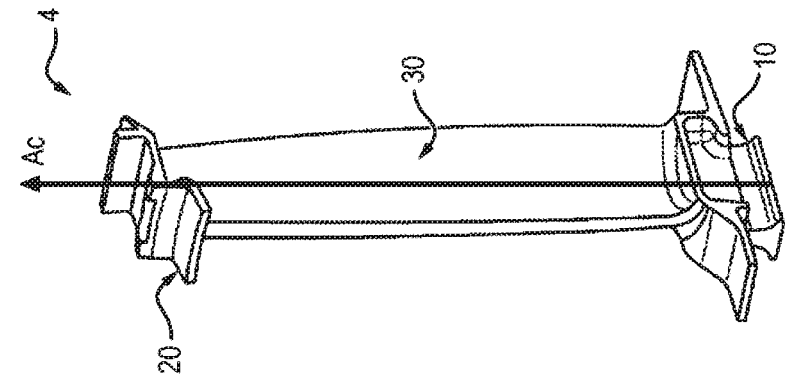
FIG. 1a, discussed above, shows a turbine engine moving blade.
Figure 2A:
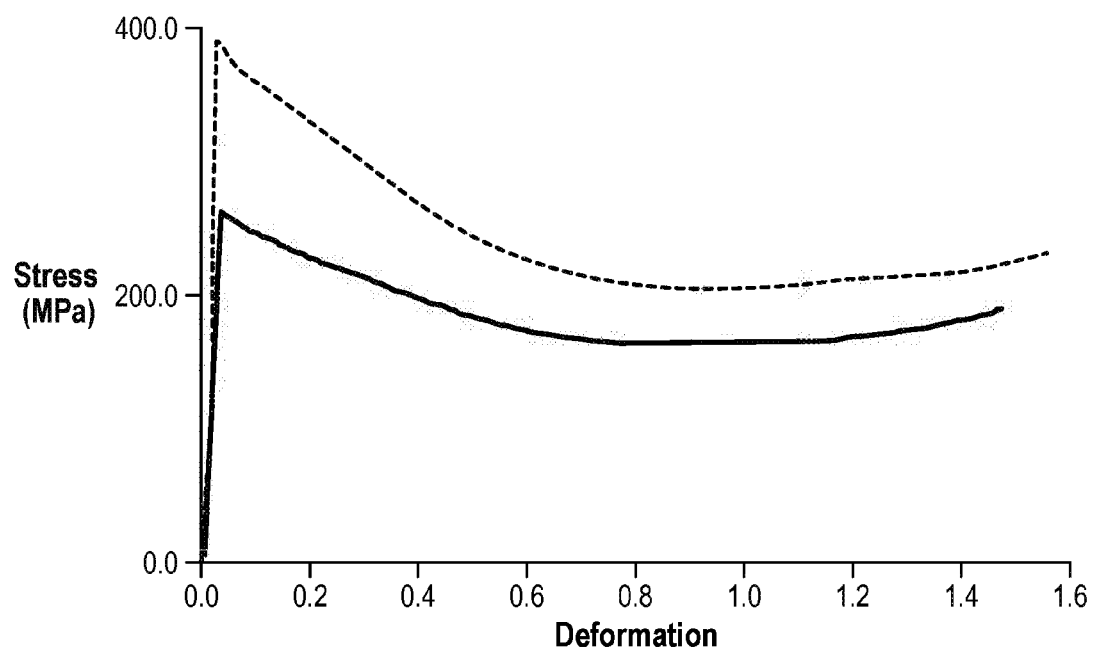
FIG. 2a, illustrates the flow stress of an ingot made of 48-2-2 alloy, as a function of the deformation exerted, for an ingot prior to extrusion (dotted line) and for an extruded ingot (solid line).
Figure 2B:
FIG. 2b is a section of an ingot made of 48-2-2 alloy prior to extrusion.
Figure 2C:
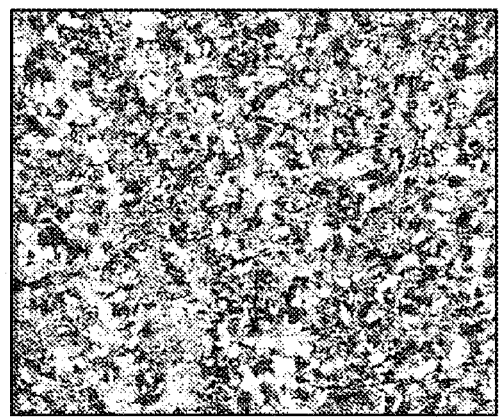
FIG. 2c is a section of an ingot made of 48-2-2 allow after extrusion.

As can be seen in FIG. 2b, which is a section of an ingot made of 48-2-2 alloy prior to extrusion, and FIG. 2c, which is a section of an ingot made of 48-2-2 alloy after extrusion, extrusion allows refining the structure of the alloy, i.e. reducing the size of the grains of the alloy. The results of the inventors, illustrated in FIG. 2a, show that the extrusion step allows reducing by 30 to 40% the flow stress of the 48-2-2 alloy. The inventors have obtained similar results with other TiAl alloys and especially with a Ti-45Al-2.4Si alloy.

Extrusion allows, at the same time, giving an extruded ingot the shape defined by the shape of the opening 52 of the die 53. The shape of the opening 52 of the die 53 is selected so that the shape of the extruded ingot approximates that of the final part, which allows a reduction in the deformation necessary during the final step of conventional forging. It is then possible to obtain by conventional forging a part near the shape of the final part, and thus to delimit the final machining step.

To this end, the ingot 1 is extruded in a die, the opening 52 whereof has a main slot 55 and at least one side slot 56. The side slot 56 extends perpendicularly to the main slot 55, from one of the ends thereof, and both sides thereof, as illustrated in FIGS. 4b and 5b. An extruded ingot 2 is thus obtained having the shape of a bar with a cross-section having a main branch 25 and at least one side branch 26 perpendicular to the main branch 25, as illustrated in FIGS. 4c and 5c.

Here, the side branch is substantially perpendicular to the main slot. However, a side branch slightly inclined with respect to the main branch can be considered, this inclination possibly being a few degrees to ten degrees or thirty degrees.

In a first embodiment illustrated in FIGS. 4a to 4f, the opening 52 of the die 53 has a main slot 55 and a single side slot 56 which extends from one of the ends of the main slot 55 perpendicular to it, as illustrated in FIG. 4b. In other words, the opening 52 of the die 53 has the shape of a T. The ingot is extruded so as to obtain an extruded ingot 2 in the form of a bar with a cross-section in the shape of a T, having a main branch 25 and a side branch 26 perpendicular to the main branch 25, as illustrated in FIG. 4c. The vane 30 will be forged in the main branch 25 while the root 10 of the blade will be forged in the side branch 26.

Figure 5A:
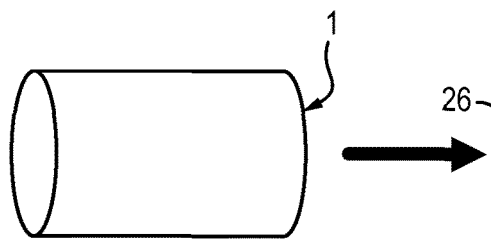
FIGS. 5a to 5e illustrate the second embodiment of the method according to the invention. In particular.
Figure 5C:
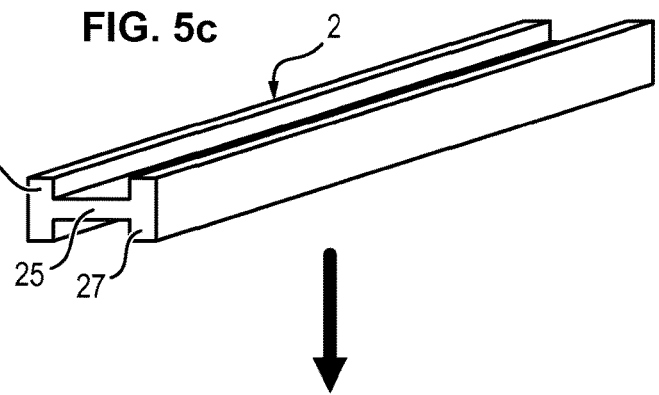
Figure 5B:
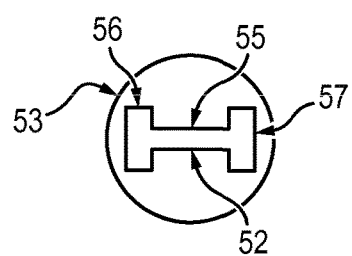
Figure 5D:
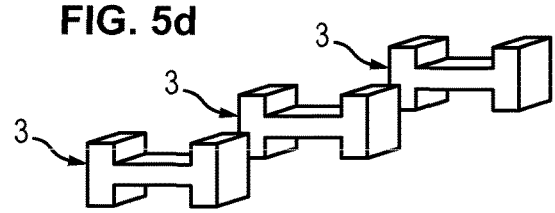

In a second embodiment illustrated in FIGS. 5a to 5f, the opening 52 of the die 53 has a main slot 55, a first side slot 56 which extends from one end of the main slot 55 perpendicular to it, and a second side slot 57 which extends from the other end of the main slot 55 perpendicular to it, as illustrated in FIG. 5b. In other words, the opening 52 of the die 53 has an H-shaped section. The ingot is extruded so as to obtain an extruded ingot 2 in the form of a bar having an H-shaped section, having a main branch 25, a first side branch 26, extending perpendicular to the main branch 25 from one end thereof, and a second side branch 27 extending perpendicular to the main branch 25 from the other end thereof, as illustrated in FIG. 5c. As in the first embodiment, the vane 30 will be forged in the main branch 25 while the root 10 of the blade will be forged in the first side branch 26. In addition, the heel 20 of the blade will be forged in the second side branch 26.

For the TiAl 48-2-2 alloy, extrusion is a relatively delicate step. Tests of unclad extrusion of ingots formed by casting often show deep cracks in certain zones of the bar. In this case, the ingot 1 is advantageously surrounded by a cladding 7, made of stainless steel for example, during a cladding step E1', so as to reduce parietal cooling of the ingot during extrusion and thus avoid deformation at a temperature that is too low locally which can cause cracks. The ingot 1 surrounded by its cladding 7 is raised to the extrusion temperature prior to passing through the die 53 through an extrusion cup 51. In this case, after extrusion, it is necessary to provide a stripping step E6 for the extruded ingot 2 which consists of eliminating the cladding, for example by turning, before forging. It can also be advantageous to eliminate the cladding material by chemical removal.

For beta type alloys on the other hand, less loaded with Al but with more Nb and Mo loading, conferring on them better forgeability than 48-2-2, extrusion can be carried out without cladding.

Heat after-Treatment

Depending on the mechanical properties sought for the functionality of the final part, a conventional heat treatment can be necessary for regenerating a controlled microstructure. In fact, the structures after forging will be fine or very fine. Certain properties, such as creep, will not be optimal after forging.

Cutting the Extruded Ingot into Sections

During step E3, the ingot is cut into sections. To this end, the ingot is cut along transverse planes by conventional metal cutting techniques such a water-jet cutting, laser cutting, or wire cutting.

Forging

As explained above, extrusion makes it possible, prior to forging, to refine the structure of TiAl alloys so as to reduce the flow stress of the alloy, namely the stress necessary to cause plastic deformation of the alloy. It is then possible to employ, after extrusion, conventional forging means allowing a part near the final shape of the blade to be obtained, which was not possible in the prior art. What is meant by conventional forging is forging in the open air and with a hot die, unlike isothermal forging.

Forging consists of applying a considerable force to the extruded ingot 2 so as to force it to assume the shape of the final part, namely the turbine engine blade.

Figure 5E:
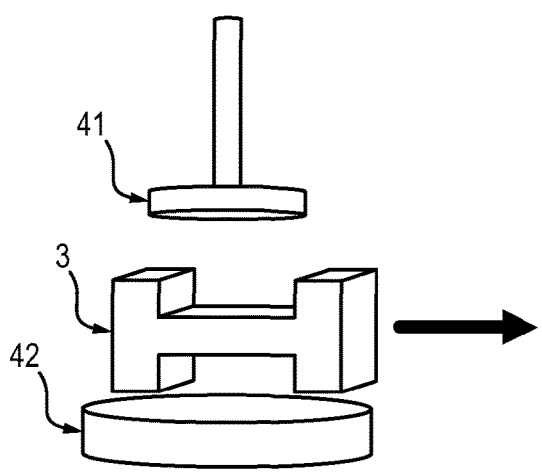
Figure 5F:
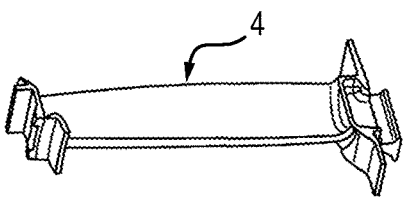
FIG. 5f shows the ingot section after the forging step.

Forging is carried out by applying a considerable force to the extruded ingot 2 by means of an impact device 41, such as a die moved hydraulically at a controlled speed, and a support 42, such as an anvil or a fixed die, as illustrated in FIGS. 4e, and 5e.

The extruded ingot 2 having a cross-section shape having a main branch 25 and at least one side branch 26 perpendicular to the main branch 25, the vane 10 of the blade is forged in the main branch 25, and the root 10 of the blade is formed by forging in the side branch 26. If the cross section of the extruded ingot has two side branches 25 and 27, the root 10 of the blade will be formed by forging in one of the side branches 25, and the heel 20 in the other side branch 26. Thus, the shape of the extruded ingot 2 approximates that of the final part 4, which allows a reduction in the deformation necessary during the forging step.

The blades 4 obtained by forging are more resistant to mechanical stresses because the deformation of the metals generates a large number of metallurgical phenomena, both at the microscopic and the macroscopic levels.

In particular, extrusion causes, due to the shape of the extruded ingot, an orientation of the lamellar grains of the alloy, through the influence of the work of deformation, in the direction perpendicular to the loading axis of the blade. The orientation of the lamellar grains of the alloy in the direction perpendicular to the loading axis of the blade allows an increase in the resistance of the blade to mechanical stresses to which it will be subjected in operation.

Forging need not be isothermal (isothermal forging requires that tooling be brought to temperatures for heating the metal to be forged greater than 1000°) and can be carried out in the open air on hot dies with a tooling temperature typically comprised between 600° and 950° C.

The invention claimed is:

1. A method for manufacturing a turbine engine blade, made of titanium aluminide, comprising:
   forming a titanium aluminide ingot;
   extruding the titanium aluminide ingot through an opening of a die, the opening having a main slot and at least one side slot which extends from one of the ends of the main slot substantially perpendicular to said main slot, so as to obtain an extruded ingot having the shape of a bar with a cross-section having a main branch and at least one side branch substantially perpendicular to the main branch;
   transverse cutting of the extruded ingot so as to obtain sections of extruded ingot;

forging of each section of extruded ingot so as to obtain a turbine engine blade, wherein said forging is carried out in hot dies with a temperature comprised between 600° and 950° C., wherein the titanium aluminide ingot is formed by powder spraying, said method further comprising cladding the titanium aluminide ingot prior to said extruding and stripping between said extruding and the forging.

2. The method for manufacturing a turbine engine blade according to claim 1, wherein the opening of the die has a single side slot which extends from one of the ends of the main slot, perpendicular to said main slot, so as to obtain the extruded ingot in the form of a bar with a cross-section having the main branch and a single side branch which extends from one of the ends of the main branch, perpendicular to said main branch.

3. The method for manufacturing a turbine engine blade according to claim 1, wherein the opening of the die has a first side slot winch extends from one end of the main slot, substantially perpendicular to said main slot, and a second side slot which extends from the other end of the main slot substantially perpendicular to said main slot, so as to obtain the extruded ingot in the form of a bar having a cross-section having the main branch, a first side branch extending substantially perpendicular to the main branch from one end thereof, and a second side branch extending substantially perpendicular to the main branch from the other end thereof.

4. The method for manufacturing a turbine engine blade according to claim 1, said forging being carried out in the open air.

5. The method for manufacturing a turbine engine blade according to claim 1, further including machining after said forging.

* * * * *

UNITED STATES PATENT AND TRADEMARK OFFICE
CERTIFICATE OF CORRECTION

PATENT NO. : 10,758,957 B2  
APPLICATION NO. : 15/576783  
DATED : September 1, 2020  
INVENTOR(S) : Gilbert Leconte et al.

Page 1 of 1

It is certified that error appears in the above-identified patent and that said Letters Patent is hereby corrected as shown below:

In the Specification

In Column 3, Line 41, "s" should read -- is --.

In Column 5, Line 32, "(atomic%))" should read -- (atomic%) --.

In Column 6, Line 39, "remerge" should read -- re-merge --.

In the Claims

In Column 10, Line 3, Claim 3, "winch" should read -- which --.

Signed and Sealed this  
Twenty-sixth Day of January, 2021

Drew Hirshfeld  
*Performing the Functions and Duties of the  
Under Secretary of Commerce for Intellectual Property and  
Director of the United States Patent and Trademark Office*